United States Patent [19]

Flanagan

[11] 4,423,412
[45] Dec. 27, 1983

[54] INDUSTRIAL PROCESS INDICATING/RECORDING APPARATUS USING STEPPING MOTOR DRIVE

[75] Inventor: Allan L. Flanagan, Attleboro, Mass.

[73] Assignee: The Foxboro Company, Foxboro, Mass.

[21] Appl. No.: 306,955

[22] Filed: Sep. 30, 1981

[51] Int. Cl.³ ............................................. G08B 21/00
[52] U.S. Cl. ..................................... 340/661; 324/100; 324/113; 340/317; 340/809; 340/815.24; 340/870.43; 346/17
[58] Field of Search ........... 340/315, 317, 809, 815.24, 340/870.43, 661; 346/17, 139 A; 324/100, 113

[56] References Cited

U.S. PATENT DOCUMENTS

| | | | |
|---|---|---|---|
| 2,996,670 | 8/1961 | Simonton | 324/100 |
| 3,091,756 | 5/1963 | Lowman | 346/17 X |
| 3,439,228 | 4/1969 | Gormley | 340/661 X |
| 3,482,234 | 12/1969 | Doniger et al. | 340/661 |
| 3,633,200 | 1/1972 | Ellison et al. | 340/870.43 X |
| 3,825,920 | 7/1974 | Nelson et al. | 346/17 X |
| 3,879,662 | 4/1975 | Barneck | 340/661 |
| 4,291,356 | 9/1981 | Mathieu | 340/661 X |

Primary Examiner—David L. Trafton

Attorney, Agent, or Firm—Parmelee, Bollinger & Bramblett

[57] ABSTRACT

A compact ribbon-indicator and chart-recorder instrument for use in process control systems adapted to indicate and simultaneously record the values of up to three independent process variables. The motive power for each pen/indicator drive system is supplied from a corresponding relatively high-speed stepping motor. Each such motor is servo-controlled by a feedback circuit including a potentiometer coupled to the pen drive cable for developing a d-c feedback signal to be compared with the d-c measurement signal. The system is arranged to actuate the motor immediately upon development of a deviation signal outside of a fixed deadband, but the extent of initial motor movement is limited to a pre-set small amount (preferably one step). If the deviation signal still is outside of the dead-band after a predetermined period of time, a clock pulse oscillator is turned on to actuate the motor at a relatively rapid rate until the deviation signal returns to the dead-band. The instrument also includes special limit circuitry for preventing motor activity when the pen has been driven to either end of its full-scale stroke. An optional addition is an alarm system which makes it possible to adjust the alarm set-point while observing its value on the indicator scale at the front panel, thereby avoiding need for a precision calibrated set-point potentiometer.

15 Claims, 8 Drawing Figures

INDUSTRIAL PROCESS INDICATING/RECORDING APPARATUS USING STEPPING MOTOR DRIVE

BACKGROUND OF THE INVENTION

1. Field of the Invention

This invention relates to industrial process instruments for displaying the values of measured process variables such as temperature, pressure, and flow rate. More particularly, this invention relates to indicators and/or chart recorders especially adapted for installation as part of the control panel of a process instrumentation system. In a preferred embodiment of the invention to be described, a combination indicator-and-recorder presents the values of up to three independent variables by means of so-called ribbon indicators, and simultaneously produces a permanent strip chart record of the values of those variables.

2. Description of the Prior Art

A wide variety of instruments have been used over the years for displaying and recording the measured values of industrial process conditions such as temperature, pressure, flow rate, etc. With the ever-increasing complexity of modern industrial processes, and the need to control the processes from a central station having an operator's panel display, there has been increasing need for reduction in size of the panel area occupied by each instrument, and in recent years the size of indicating and/or recording instruments has been reduced correspondingly. Also, the number of such instruments required for any given process has been reduced by arranging the instruments to indicate or record more than one variable per instrument.

So-called rectilinear-chart recorders are generally considered to be superior, and because of the relatively large pen-drive power requirements, rectilinear chart recorders commonly have employed servo motors to move the pen. In such equipment, the motor is controlled by an error signal representing the difference between the measurement signal and a pen-position feedback signal. The error signal is directed to an amplifier which in turns drives the servo motor, and thus the pen-drive power is not limited to that available from the measurement signal. Certain indicator/recorders presently offered use a pen drive of the stepping motor type, which has some inherent characteristics which are well suited to the pen drive function.

Experience with such indicator/recorders currently available indicates that improvements are needed to provide a fully satisfactory instrument. For example, achieving proper dynamic response of the pen motion for a given error condition is difficult, due in part to the incremental nature of the pen drive motion. In addition, operational problems are encountered when the pen is driven close to or into the limit positions at the ends of the full-scale pen stroke. Also, there is a need to simplify the pen drive apparatus to assure that it is adequately compact, light in weight, and reasonably inexpensive to manufacture. The present invention is aimed at solving or reducing such problems.

SUMMARY OF THE INVENTION

In one presently preferred embodiment of the present invention to be described below in detail, there is provided a combined indicator/recorder instrument capable of indicating and simultaneously recording the values of three independent process variables. The motive power for positioning each movable display device (i.e., a ribbon indicator and a chart pen) is supplied by a stepping motor the output shaft of which is coupled through a gear-train and a drive drum to a flexible steel cable secured to the display device. A rotary potentiometer is mounted with the drive drum to develop an analog feedback signal to be compared with the measurement signal. The comparator activates logic circuitry which controls the motor drive circuitry as to extent and direction of movement as necessary to reduce the error signal to within a small dead-band about the measurement signal.

Dynamic response to an error signal outside of the dead-band is enhanced by a special circuit which produces an initial limited movement of the stepping motor, and delays any further movement for a pre-set period of time. Thus, if the initial movement returns the error signal to within the dead-band within the pre-set delay time, there will be no further stepping of the movement which would be apt to produce an overshoot of the pen position. A further aspect of the disclosed embodiment comprises means to limit the number of steps the motor can take after it has reached a position close to the end of the pen travel, thereby preventing prolonged motor activity if the pen reaches the end of its stroke. The apparatus features improved means for adjusting the set-point for an alarm circuit, wherein the setting is observed directly on the calibrated output scale of the instrument, thereby making it possible to adjust the setting by means of a relatively inexpensive uncalibrated potentiometer. The disclosed instrument also includes simplified logic circuitry for activating the stepping motor.

Accordingly, it is an object of the present invention to provide improved apparatus and methods for indicating and/or recording the values of variables such as temperature, pressure and flow rate. It is a more specific object of the invention to provide an instrument for such purposes having superior dynamic response characteristics, and important operational advantages. A still further object of the invention is to provide such an instrument that can be manufactured economically and operated reliably. Other objects, aspects and advantages of the invention will in part be pointed out in, and in part be apparent from, the following description of a preferred embodiment, considered together with the accompanying drawings.

DESCRIPTION OF A PREFERRED EMBODIMENT

Figure 1:
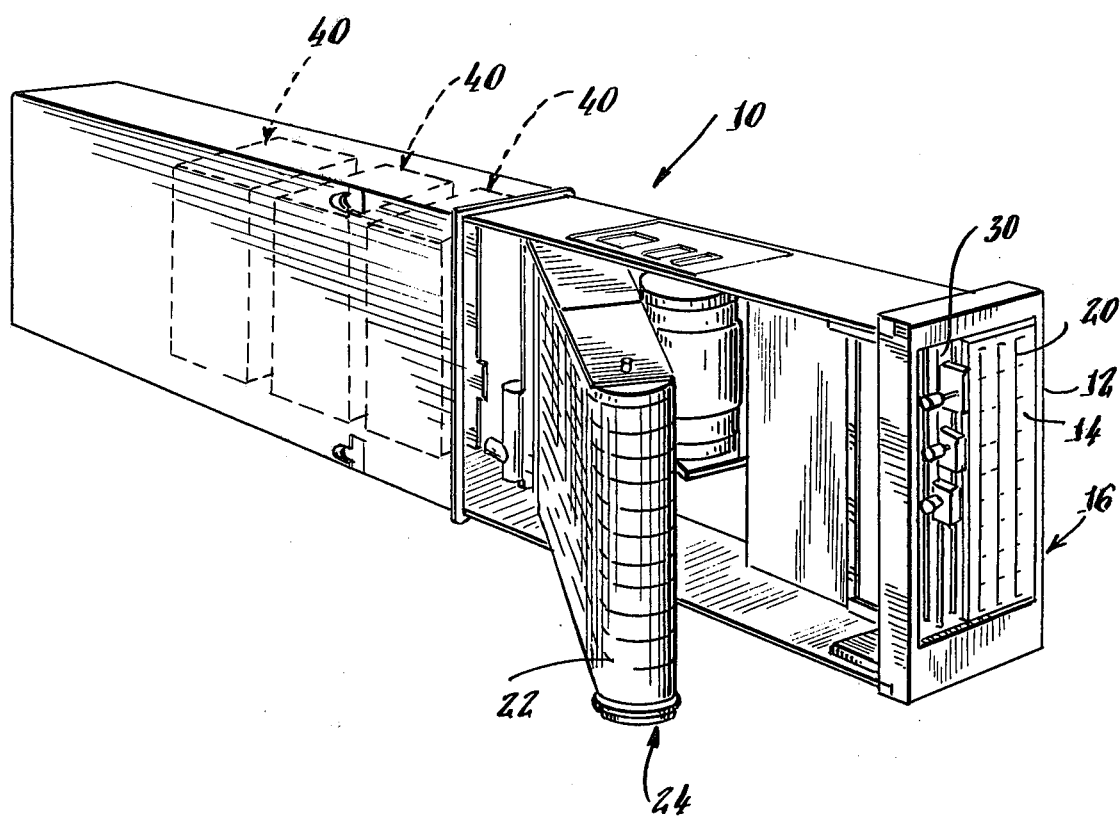
FIG. 1 is a perspective view of an indicating/recording instrument based on the present invention.

Referring now to FIG. 1, there is shown in perspective an instrument arranged for both indicating and recording the values of three different process conditions such as temperature or flow rate. This instrument comprises an elongate rectangular housing 10 having a width of only about 2.75 inches, and with that relatively small size it is well adapted to be installed in multi-instrument process control stations together with a number of other such instruments.

At the front of the instrument is a face plate 12 which is pivotally mounted to the housing 10. The face plate includes a transparent plastic section 14 through which an operator can view three vertically-movable ribbon indicators 16 located adjacent scale indicia 20 so as to provide the operator with numerical values of the process conditions being measured. Also visible through the transparent section 14 is a portion of a rectilinear strip chart 22 carried by a removable cassette 24 pivotally supported in the housing 10. This chart is driven at constant speed, from right-to-left, by a conventional electrical motor drive arrangement (not shown).

Figure 2:
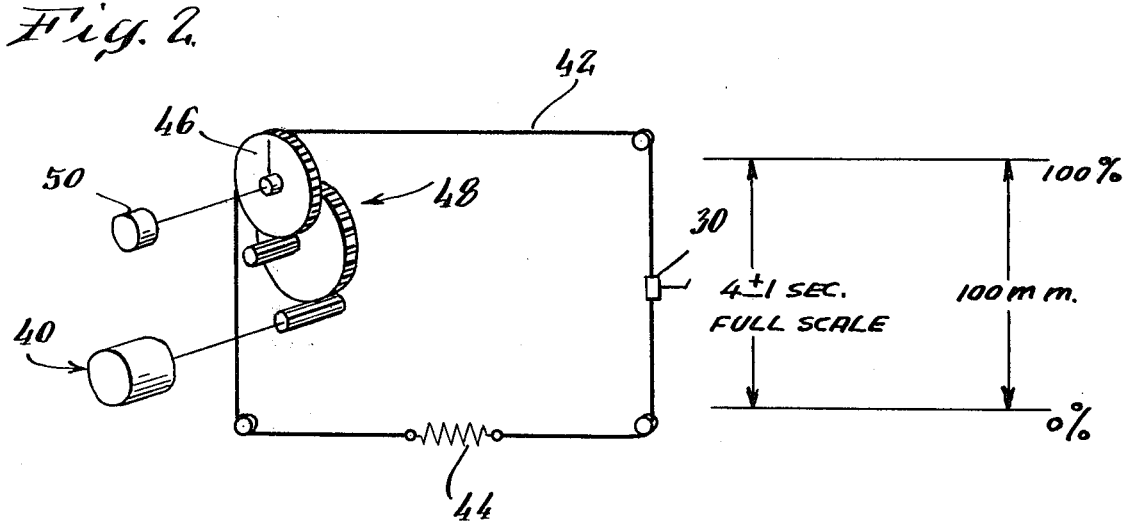
FIG. 2 is a perspective view of the operating elements of the display drive system.

Vertically-movable fiber-tip pens 30 contact the chart 22 to provide permanent ink trace records thereon representing the values of the process conditions which are also indicated by the ribbon indicators 16. Each pen, together with its corresponding ribbon indicator, is positioned vertically by a pen drive system the basic elements are shown in FIG. 2. This drive system includes a stepping motor 40 controlled by an error-sensing arrangement which compares the actual display position to the commanded position represented by the process condition measurement signal, and produces appropriate control signals. The instrument will incorporate up to three identical such pen/indicator drive systems which operate independently of one another. However, it is to be understood that an instrument in accordance with basic aspects of the invention could be arranged to display only a single process variable if desired.

Returning now to the description of the preferred embodiment, the pens 30 form part of conventional replaceable pen cartridges, each including a container of ink with a quantity sufficient for a relatively long period of operation, e.g. several months or more. The ink colors are different, for example, red, green and blue, in order to aid the operator in quickly distinguishing among the process conditions being portrayed.

Each pen 30 (with its associated ribbon indicator) is secured to a flexible steel cable 42 arranged in a closed loop including a tension spring 44, and passing around a drive drum 46. This drum is coupled through a gear train 48 to the stepping motor 40. A rotary feedback potentiometer 50 is connected directly to the shaft of the drive drum 44 to produce an analog signal representing the actual pen position.

Figure 3:
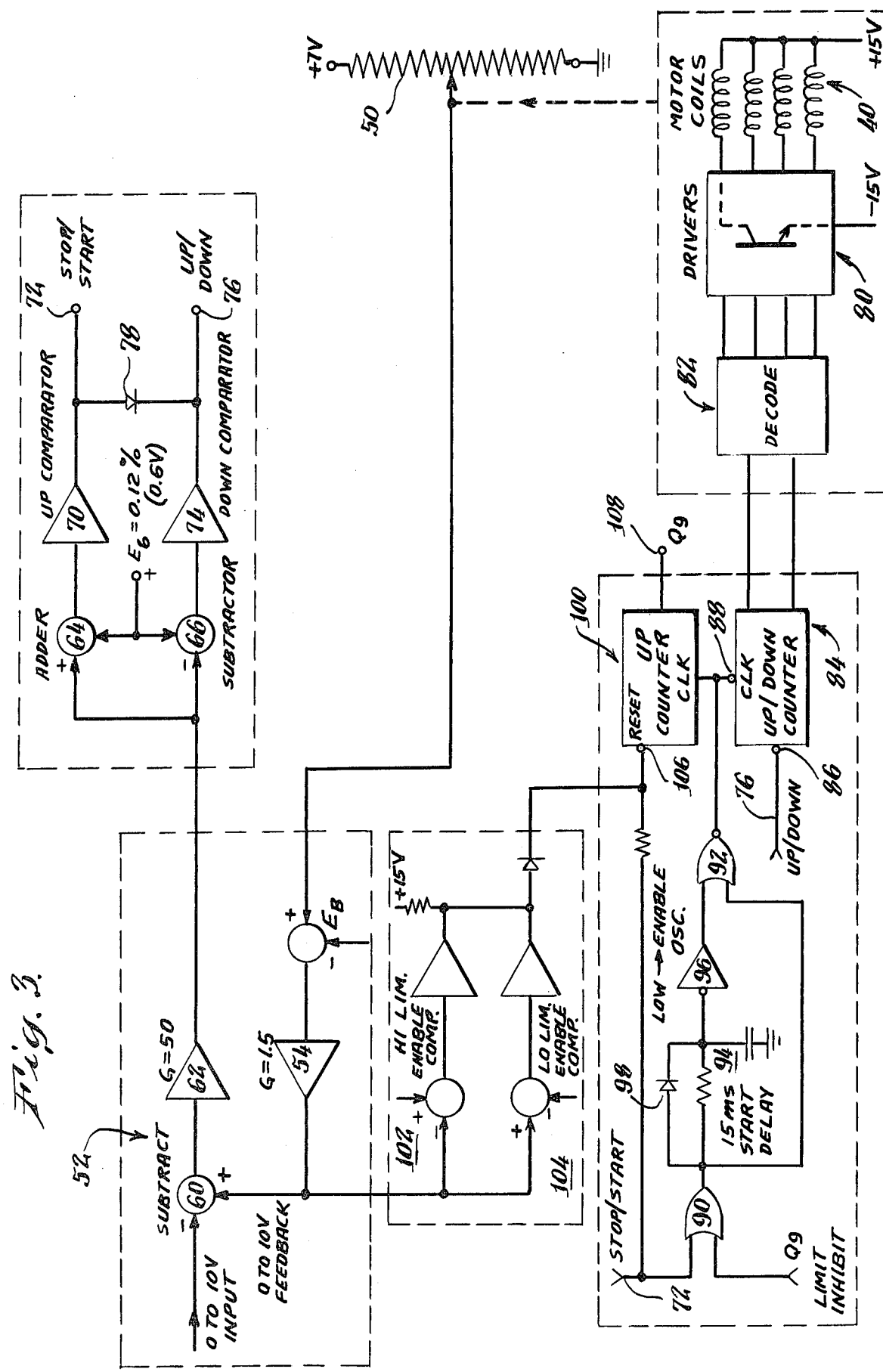
FIG. 3 is a block diagram illustrating the overall drive control system.

Referring now to the upper left-hand corner of FIG. 3, an input measurement signal (e.g. of 0–10 volts magnitude) is applied to a comparison circuit generally indicated at 52, together with a feedback signal derived from the rotary potentiometer 50 referred to above. The feedback signal includes a bias voltage $E_B$ to compensate for the zero-position characteristic of the potentiometer 50, and is amplified by an amplifier 54. This amplifier, in the present embodiment, has a gain of 1.5 to produce a feedback signal in the range of 0–10 volts, matching that of the measurement signal.

The comparison circuit 52 includes a subtraction circuit 60 followed by an output amplifier 62 having a gain, in this case, of 50. The amplified comparison signal is directed to a pair of parallel-connected comparators in the form of an adder 64 and a subtractor 66. These comparators receive their second input signals from a single bias voltage source $E_G$ establishing a dead-band for the stepping motor servo system. The magnitude of the bias voltage can for example be set at a value providing a dead-band of about 0.12% of the full-scale range of pen movement, and the pen position error must exceed either the high or the low limit of that band before any actuation of the stepping motor takes place.

The output of the adder 64 is directed to an Up-Comparator 70 producing at logic terminal 72 a binary signal identified as "Stop/Start". Similarly, the output of the substractor 66 is directed to a Down-Comparator 74 producing at logic terminal 76 a binary signal identified as "Up/Down". A diode 78 connects terminals 72 and 76 for a reason which will become apparent from the description below.

When the deviation (or error) signal from the comparison circuit 52 is within the dead-band set by bias voltage $E_G$, the signals on both logic terminals 72, 76 will be high (+), corresponding, respectively, to the functions "Stop" and "Up". For example, with a deviation of +0.1% (pen position above the measurement by 0.1% of full-scale), the output of the subtraction circuit 60 will be 10 millivolts (for full-scale input signals of 0–10 volts), and the output of the amplifier 62 will be 0.5 volts. Thus, the inputs to both the Up-Comparator 70 and the Down-Comparator 74 will be positive (+1.1 V and +0.1 V, respectively), so that their outputs will correspondingly be positive. The high output on terminal 72 corresponds to "Stop", and commands that there be no actuation of the stepping motor 40; the high output on terminal 76 corresponds to "Up" direction of pen movement, but has no effect since the stepping motor is not to be actuated in the circumstances described.

When the deviation signal is above the dead-band (e.g. a deviation of +1%), the input to the Up-Comparator 70 will still be positive, tending to cause the logic terminal 72 to go positive. The input to the Down-Comparator 74 will be negative, and thus the logic terminal 76 will go low (−), commanding the pen to move "Down". The diode 78 transfers this low signal to the logic terminal 72, causing it to go low ("Start"), even though the input to the Up-Comparator is positive. Thus, the two logic signals together command the motor to move the pen in a down direction.

When the deviation signal goes negative to below the pre-set dead-band (e.g. a deviation of −1%), the input to the Up-Comparator 70 will go low and the input to the Down-Comparator 74 will go high. Thus the logic terminals 72 and 76 develop the motor command signals "Start" (−) and "Up" (+), respectively, indicating that the stepping motor is to be actuated in an Up direction to move the pen back to the measurement value.

Referring now to the lower right-hand corner of FIG. 3, the stepping motor 40 is illustrated as a conventional four-coil type, with the coils being energized in appropriate sequence by a set of driver transistors schematically shown at 80. The driver transistors, in turn, are activated by the output of a decoder circuit, generally indicated by a block 82, which receives a pair of binary motor control signals from an Up/Down Counter 84. A control terminal 86 of this Counter receives the Up/Down signal from the logic terminal 76 referred to above, so that this signal determines which direction the Counter will count when clock pulses are applied to the Counter clock terminal 88. Application of such clock pulses is controlled by the "Stop/Start" signal referred to previously, by means of circuitry now to be described.

Referring now to the lower left-hand corner of FIG. 3, it will be seen that the "Stop/Start" logic signal from logic terminal 72 is applied to an Or gate 90 the other input to which normally is low. Thus, when the "Stop/Start" signal goes low (signifying that the deviation signal has gone outside of the pre-set dead-band so that the stepping motor 40 should "Start"), the output of gate 90 goes low. This low signal is applied to two signal paths to produce a "dual" sequential activation of the motor-actuating Counter 84. These two signal paths are as follows: (1) the low logic signal goes directly to an inverting Or gate 92 which substantially immediately produces a high output pulse for the clock terminal 88 of the Counter 84, and (2) the low signal also is directed through an RC time-delay circuit 94 to the input of a clock-pulse oscillator 96 arranged, when turned on by the delayed yellow logic signal, to transmit clock pulses through the Or gate 92 to the clock terminal 88 of the Counter 84.

The RC circuit 94 delays activation of the oscillator 96 for a period of about 15 milliseconds following establishment of the "Start" signal, i.e. a period equivalent to about 3 pulses from the oscillator when operating at the preferred frequency of 205 Hz. Thereafter, if the "Start" signal remains low, the oscillator turns on and transmits clock pulses through the Or gate 92 to the clock terminal of the Counter 84. Thus, the Counter will be caused to make an immediate count of "one" by the non-delayed low signal from the first Or gate 90, followed, after a short delay, by a further series of counts produced by the oscillator clock pulses for as long as the deviation signal remains outside of the pre-set dead-band. The stepping motor 40 will correspondingly be activated immediately to take a single step upon generation of the "Start" signal, and, after the prescribed short delay period, will (if the "Start" signal remains on) be activated to take a further series of steps until the deviation signal returns to within the dead-band.

This "dual" sequential motor activation as described above provides excellent dynamic response for the different circumstances encountered in process condition measurements. For example, if the deviation signal is varying quite slowly as it moves outside of the dead-band, the initial immediate actuation of the stepping motor, to produce a limited corrective action of pre-set extent (one motor step in this case), can effect a complete correction of the pen position back to within the dead-band without any further motor actuation by the oscillator 96.

It should be noted that if a motor actuation system were employed wherein the "Start" signal turned on the oscillator immediately, the circumstance of a slowly-varying deviation signal described above may result in the stepping motor being over-driven by the ensuing stream of clock pulses, causing the pen to be moved through the dead-band and out the other side. That is, due to the inherent time lag in the motor movement resulting from the finite current rise-time in the motor coils, and also from mechanical inertia, an excessive number of actuating pulses could be transmitted to the stepping motor before the effects of the initial corrective action were sensed by the feedback comparator circuitry. The cumulative effect of such excessive pulses could be to cause the pen to overshoot its correct position.

If the deviation signal is varying quite rapidly as it leaves the dead-band, the corrective action needed will be relatively substantial. This result is produced in the disclosed apparatus by the stream of clock pulses from the oscillator 96, which drives the stepping motor 40 at high speed to move the pen to a position where the deviation signal is returned to within the dead-band.

Thus it will be seen that the overall motor drive system of the disclosed embodiment is capable of controlling the pen response in ways which are suited to the varied conditions encountered in process measurements.

As soon as the deviation signal has been returned to within the dead-band, the "Stop/Start" signal on logic terminal 72 goes high, so that the output of the Or gate 90 also goes high. This high signal is passed immediately through a diode 98 to the oscillator 96 (i.e. without any delay by the RC circuit 94), and turns the oscillator off to stop any further motor actuation.

If the pen is driven to the ends of its full-scale stroke, it is desirable to avoid continued activation of the motor drive system. To that end, an Up Counter 100 is enabled whenever the pen moves to a position below 5% of its full-scale stroke, or above 95% of its full-scale stroke. This UP Counter counts clock pulses from the oscillator 96 until a pre-set number is reached, at which point it produces a control signal to turn off the motor-drive system. Activation of this Up Counter is inhibited at pen positions between 5% and 95% of full-scale pen stroke by means of a pair of Limit Enable Comparators 102, 104. These circuits compare the pen position feedback signal with respective fixed bias voltages, and apply a high signal to the Reset terminal 106 of the Up Counter until the pen moves to within 5% of either end of its range of movement.

When the pen moves into either of the 5% limit bands adjacent the end positions, the corresponding one of the two Limit Enable Comparators 102, 104 produces a low output signal to enable the Up Counter 100 which thereupon commences to count clock pulses. When the Up Counter reaches its pre-set limit count, a counter output terminal 108 goes high. This high signal is applied to the lower input of the Or gate 90; the gate output correspondingly goes high and immediately turns off the oscillator 96, stopping further activity of the stepping motor.

In the preferred embodiment, the pre-set limit count for the Up Counter 100 was fixed at 256 clock pulses, corresponding to a time period of about 1.25 seconds. With a full-scale pen movement of 859 steps, about 43 clock pulses are required to traverse the 5% limit band at either end of the pen stroke. Thus, after the pen reaches its end position, an additional 213 pulses must be produced before the Up Counter 100 reaches its pre-set limit count, i.e. a time period of only about one additional second. The pen drive is arranged to provide slippage when at the full-stroke position, so that no damage can occur during the time period before the motor is turned off.

The system also is so arranged that if the pen is moved back and forth while still remaining within the 5% limit band, the Up Counter 100 will be prevented from continuing its count to the pre-set limit, which otherwise could cause the motor drive to be deactivated without reaching the end position. More specifically, if the pen stops while within 5% of either end of its full-scale stroke, but before reaching the end position, the deviation signal from the comparison circuit 52 will go to zero so as to change the "Start" signal to "Stop". This will shut off the oscillator 96, and reset the Up Counter 100.

Figure 4:
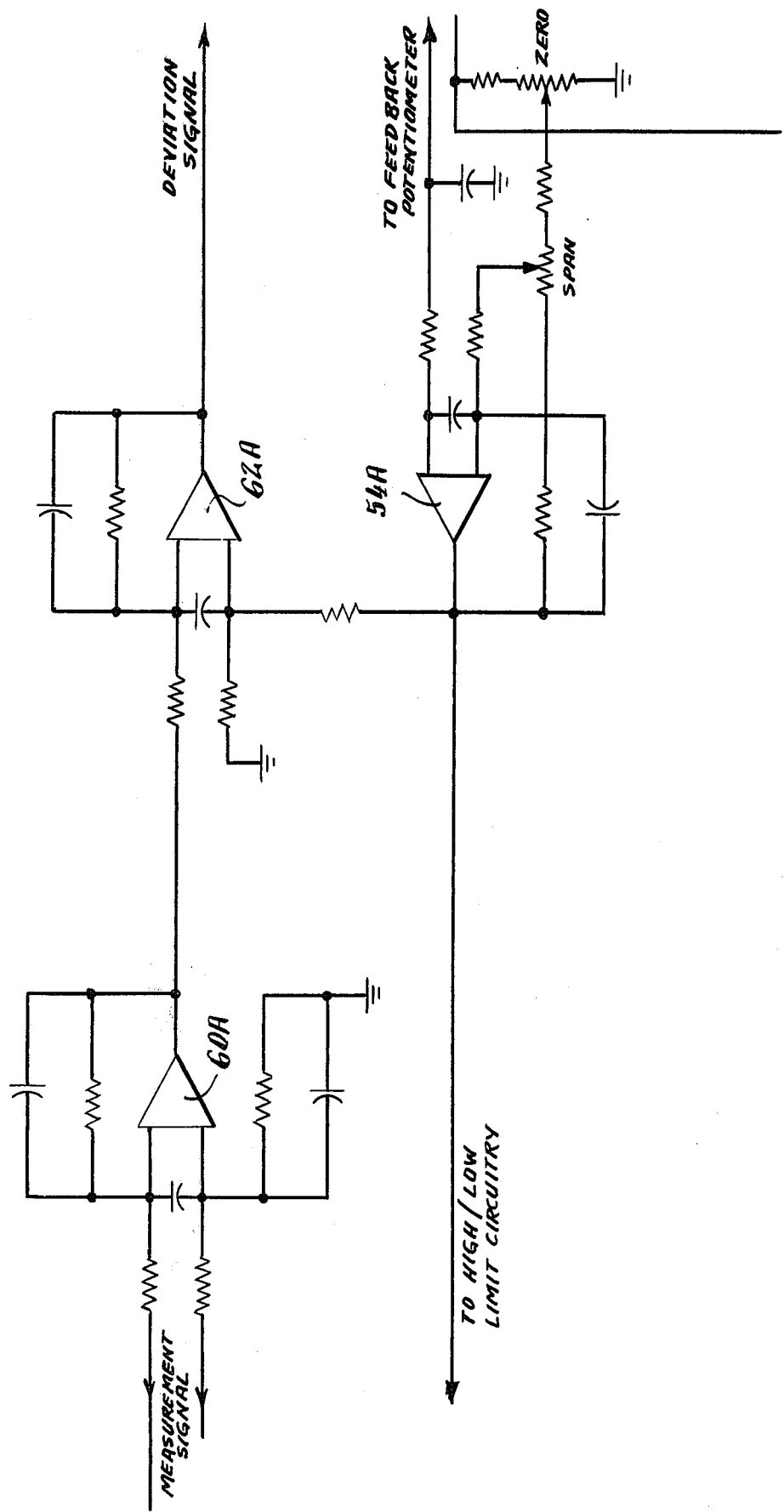
FIG. 4 is a circuit diagram showing details of the comparator circuitry for the system of FIG. 3.

FIG. 4 gives details of the comparison circuit 52 and shows that it comprises an isolator/subtractor amplifier 60A followed by a second amplifier 62A, each provided with appropriate resistors and capacitors. A feedback amplifier 54A has its input connected through span and zero adjustment potentiometers to the movable arm of the feedback potentiometer 50.

Figure 5:
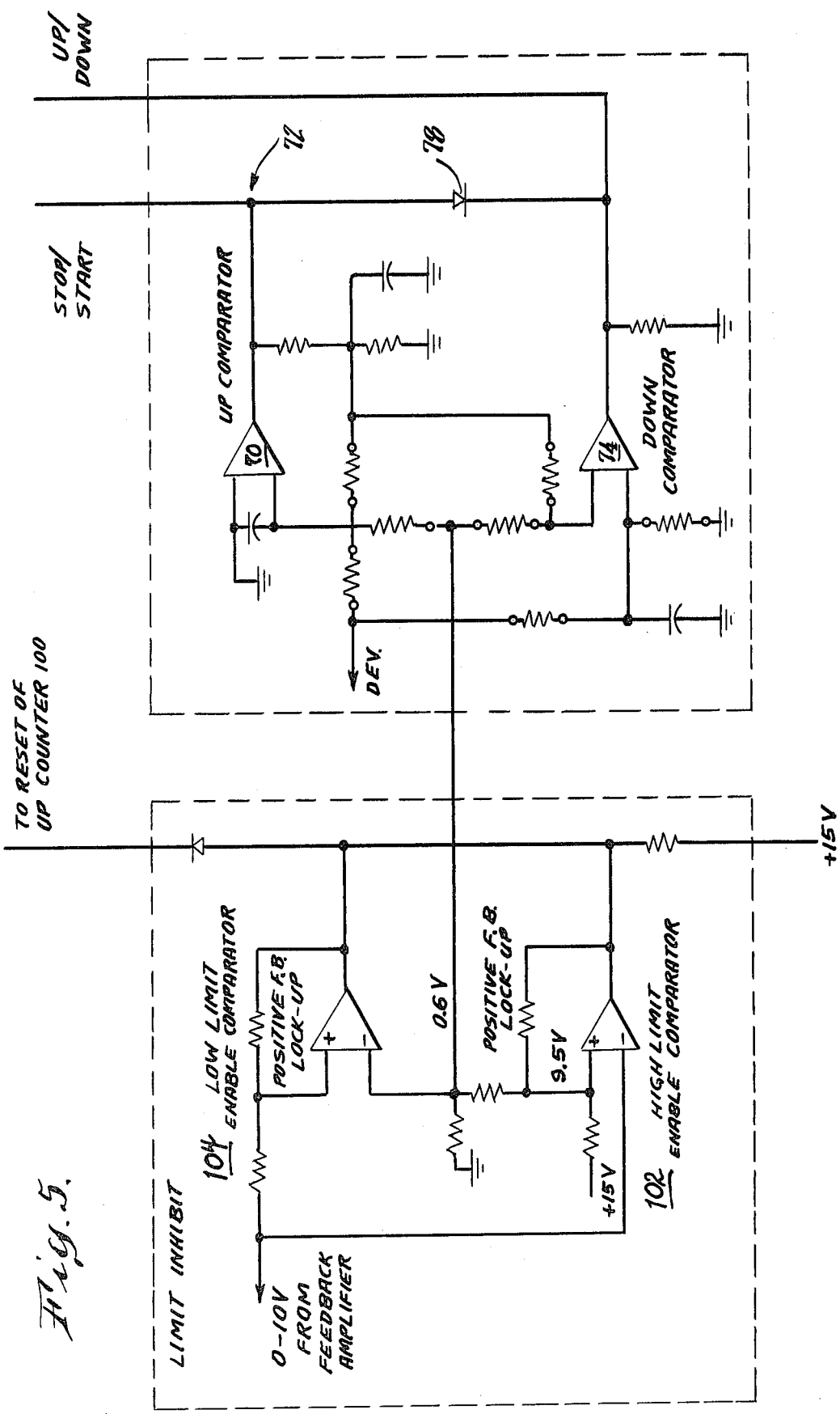
FIG. 5 is a circuit diagram showing details of the logic circuitry for the system of FIG. 3.
Figure 6:
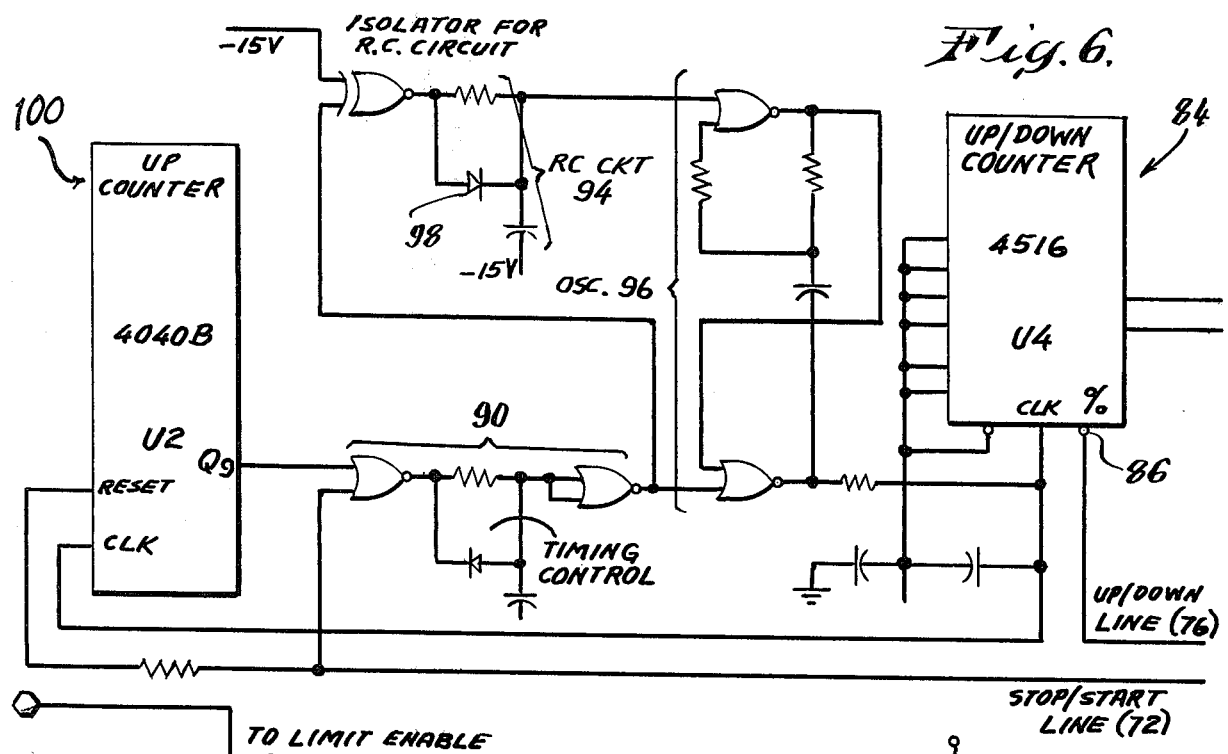
FIG. 6 is a circuit diagram showing details of the pulse counter circuitry for the system of FIG. 3.
Figure 7:
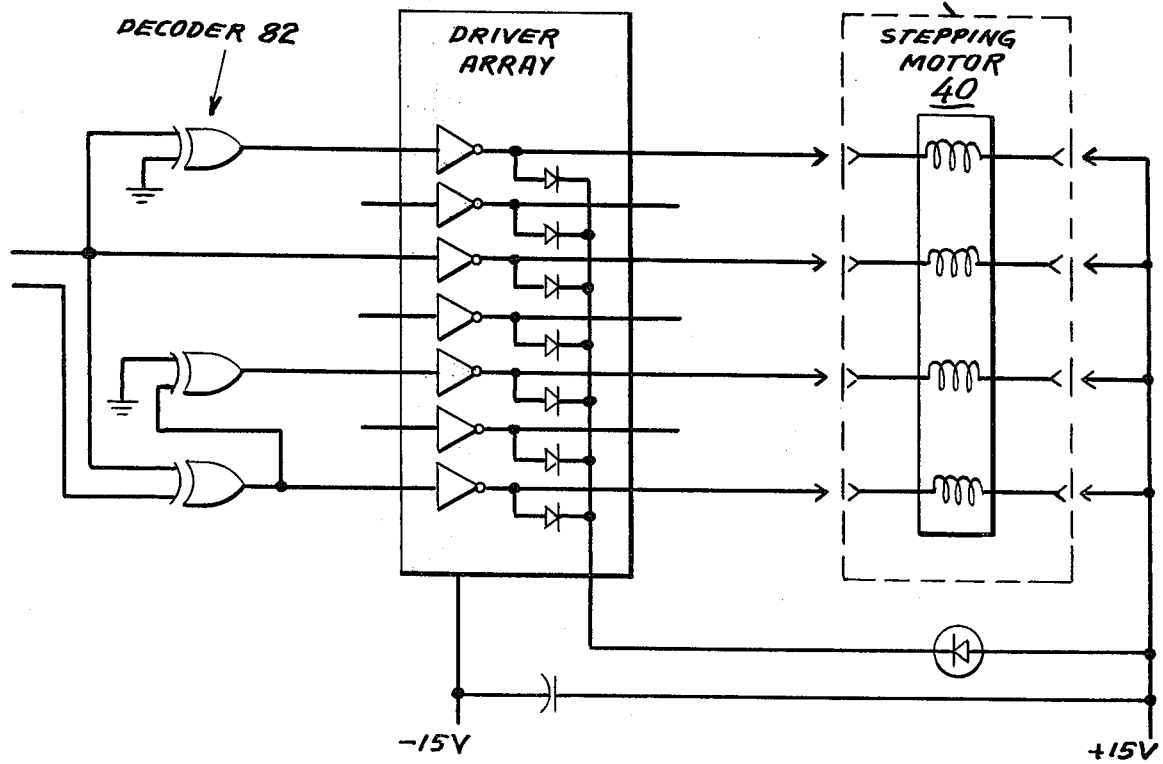
FIG. 7 is a circuit diagram showing details of the motor control circuitry for the system of FIG. 3.

FIG. 5 shows, in its left-hand portion, details of the Limit Enable Comparators 102, 104. A small amount of positive feedback is provided to effect lock-up after crossing the limit band. The right-hand portion of FIG. 5 gives details of the Up-Comparator 70 and the Down-Comparator 74. FIG. 6 gives details of suitable circuitry for the oscillator 96, associated logic circuitry, and the Counters 84 and 100. FIG. 7 gives details of the motor-drive circuitry.

Figure 8:
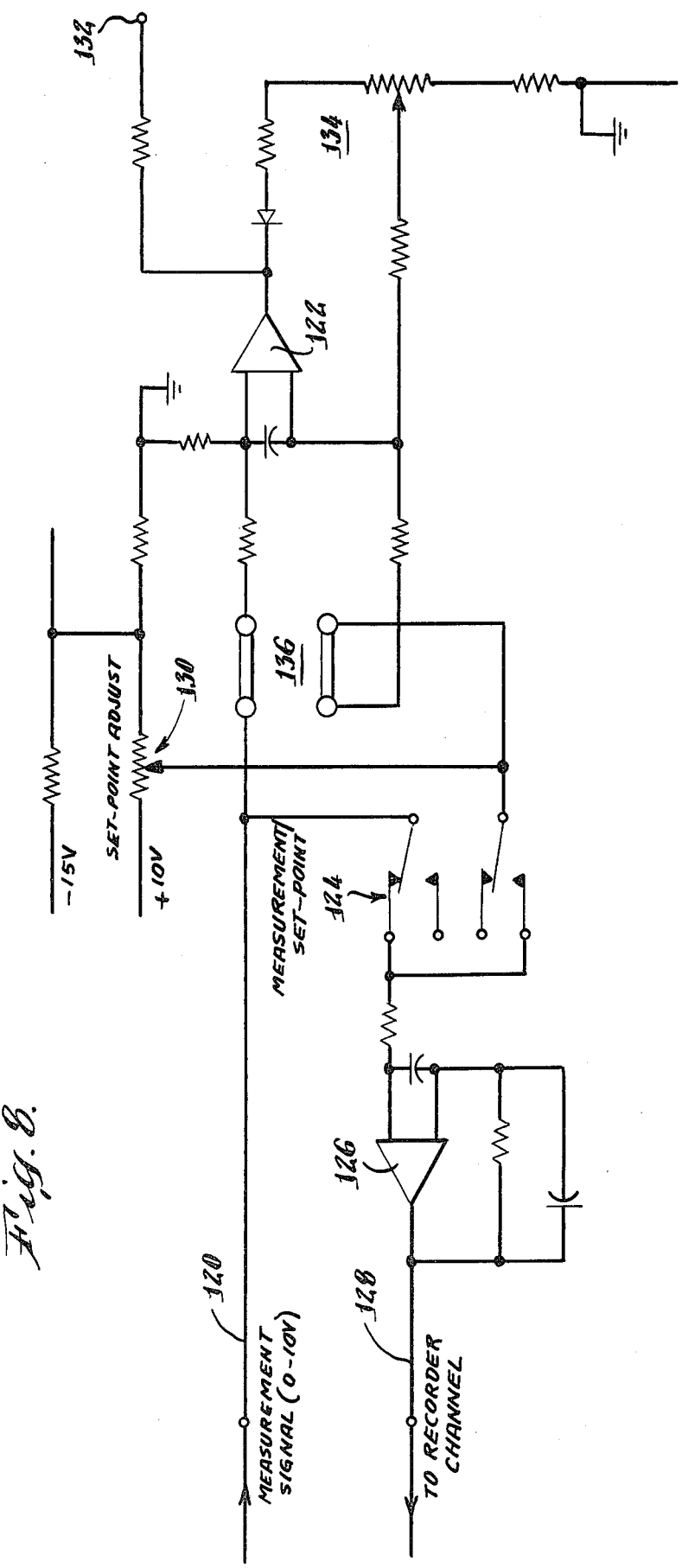
FIG. 8 is a circuit diagram showing details of the alarm set-point arrangement.

The indicator/recorder instrument described herein may optionally include apparatus for activating an alarm, sucn as a light on the front panel of the instrument, whenever the measurement goes beyond a pre-set limit. FIG. 8 shows such an alarm arrangement having the advantageous property that the alarm set-point may be set manually with high precision without requiring a calibrated potentiometer. This result is achieved by circuitry enabling the alarm set-point to be displayed on the front-panel indicator display, so that the set-point can be adjusted with precision while observing its value as represented by the ribbon indicator position with respect to its associated scale.

In more detail, and referring now to the upper left-hand corner of FIG. 8, the measurement signal (e.g. 0-10 volts) is applied to an input line 120 leading to a comparator 122. The measurement signal also is directed through a "Measurement/Set-Point" two-position switch 124 and an amplifier 126 to an output line 128 leading to the recorder channel circuitry already described, as shown in FIG. 4. The comparator 122 receives a second input signal from a set-point potentiometer 130, and is arranged normally to produce a high output signal on a logic terminal 132 until the measurement signal exceeds the set-point signal, at which time the output signal goes low. A feedback circuit 134 is incorporated to provide a small amount of positive feedback, to effect lock-up of the alarm after the alarm circuit output on terminal 132 has gone low. The signal on terminal 132 can be used to energize any desired kind of alarm device, such as a light on the front panel of the instrument.

To adjust the alarm set-point, the switch 124 first is shifted to its "Set-Point" position so that the signal from the set-point potentiometer 130 is directed through the amplifier 126 to the output line 128, and thence to the recorder channel circuitry. There the set-point signal serves as the control signal for the servo system which actuates the ribbon indicator (and also the pen, of course), causing the indicator to be positioned in accordance with the magnitude of the set-point signal. The level of the set-point signal can then be adjusted by manipulation of the potentiometer 130, bringing the set-point to a desired value as read off from the scale immediately adjacent the indicator. Accordingly, the set-point can be adjusted with high precision, e.g. to within ±0.5%, without the need for a costly calibrated potentiometer as in conventional systems.

When the set-point has been adjusted to the desired level, the switch 124 is shifted back to its "Measurement" position, and the equipment is now operable with the alarm level properly set. It may be noted that the equipment can alternatively be conditioned to provide a Low alarm rather than a High alarm, simply by changing the jumpers 136 at the input to the comparator 122. The operation in that condition is basically the same as described above for the High alarm.

Although a preferred embodiment of this invention has been described hereinabove in detail, it is desired to emphasize that this has been for the purpose of illustrating the invention, and should not be considered as necessarily limitative of the invention, it being understood that many modifications can be made by those skilled in the art while still practicing the invention claimed herein.

What is claimed is:

1. In a process instrument of the type having a movable device representing by its position the level of a process condition being monitored and driven by a stepping motor operated by sequential pulses from clock pulse means, feedback means for developing a feedback signal corresponding to the position of said movable device, and deviation means for producing a deviation signal representing the difference between such feedback signal and a measurement signal; apparatus comprising:

dead-band means responsive to said deviation signal for developing a control signal when said deviation signal falls outside of a predetermined dead-band about the position represented by said measurement signal;

first means responsive to the initial development of said control signal for activating said stepping motor to produce a limited corrective action of preset extent tending to return said device to the position represented by said measurement signal; and second means including timing means responsive to said control signal for activating said stepping motor beyond said preset extent only if said deviation signal is still outside of said dead-band at the end of a predetermined time period following activation of said stepping motor by said first means.

2. Apparatus as claimed in claim 1, wherein said first means comprises means to direct to said stepping motor a predetermined limited number of clock pulses.

3. Apparatus as claimed in claim 2, wherein said first means produces a single pulse for said stepping motor.

4. Apparatus as claimed in claim 1, wherein said timing means comprises means to produce a time-delay activating signal for said stepping motor, the delay time corresponding to at least several clock pulses following the initial motor activation by said first means.

5. Apparatus as claimed in claim 4, wherein said time-delay means comprises an RC circuit for delaying the applied control signal, and diode means for permitting immediate deactivation of the control signal when the deviation signal returns to within said dead-band.

6. In a process instrument of the type having a movable device representing by its position the level of a process condition being monitored and driven by a stepping motor operated by sequential pulses from clock pulse means, feedback means for developing a feedback signal corresponding to the position of said movable device within a full-scale range of positions of said device, and deviation means for producing a deviation signal representing the difference between such feedback signal and a measurement signal; apparatus comprising:

> means responsive to said deviation signal for activating said stepping motor to effect corrective action tending to return said device to the position represented by said measurement signal;
>
> limit means for producing a limit signal when said device has come within either of two predetermined limit ranges at the respective ends of full-scale displacement of said device; and
>
> means for de-activating said stepping motor after a predetermined number of stepping pulses have been directed thereto following development of said limit signal.

7. Apparatus as claimed in claim 6, wherein said limit means comprises first and second limit comparators receiving said feedback signal;

> one of said comparators being supplied with a bias signal representing a high limit position for said device;
>
> the other of said comparators being supplied with a bias signal representing a low limit position for said device.

8. Apparatus as claimed in claim 6, wherein said de-activating means comprises a counter responsive to said clock pulses for developing a de-activate signal after a predetermined number of clock pulses have been counted;

> reset signal means normally preventing operation of said counter; and
>
> circuit means operable by said limit means for disabling said reset signal means when the device has reached either of said limit ranges, whereby said counter will de-activate said stepping motor after receiving said predetermined number of clock pulses.

9. Apparatus as claimed in claim 8, including dead-band means responsive to said deviation signal for developing a control signal when said deviation signal falls outside of a predetermined dead-band about the position represented by said measurement signal; and > means responsive to said dead-band means for resetting said counter whenever said deviation signal returns to said dead-band after having gone outside thereof while said device is within one of said predetermined limit ranges.

10. In a process instrument of the type having a movable device representing by its position the level of a process condition being monitored and driven by a motor, feedback means for developing a feedback signal corresponding to the position of said movable device, and deviation means for producing a deviation signal representing the difference between such feedback signal and a measurement signal; apparatus comprising:

> an alarm circuit having an input receiving said measurement signal and an output circuit producing an alarm signal when said measurement signal matches an alarm set-point signal;
>
> adjustment means for setting said alarm set-point signal;
>
> switch means operable between first and second conditions;
>
> said switch means in said first condition directing said measurement signal to said deviation means to control the position of said movable device in accordance with the magnitude of said measurement signal;
>
> said switch means in said second position directing said alarm set-point signal to said deviation means to control the position of said movable device in correspondence to said set-point signal;
>
> whereby said adjustment means can be set to a desired signal level by observing the position of said movable device with respect to a scale as said adjustment means is varied.

11. Apparatus as claimed in claim 10, wherein said adjustment means comprises a non-precision potentiometer, the required precision of setting being provided by said scale for said movable device.

12. Apparatus as claimed in claim 10, including second switch means operable between first and second conditions;

> said second switch means in its first condition serving to set the alarm for a high-signal limit;
>
> said second switch means in its second condition serving to set the alarm for a low-signal limit.

13. In a process instrument of the type having a movable device representing by its position the level of a process condition being monitored and driven by a stepping motor operated by sequential pulses from clock pulse means, feedback means for developing a feedback signal corresponding to the position of said movable device, and deviation means for producing a deviation signal representing the difference between such feedback signal and a measurement signal; apparatus comprising:

> dead-band means responsive to said deviation signal for developing a control signal when said deviation signal falls outside of a predetermined dead-band about the position represented by said measurement signal;
>
> said dead-band means comprising first and second comparator channels each receiving said deviation signal;
>
> bias-signal means for setting the magnitude of said dead-band;
>
> means to apply said bias signal to both of said channels;
>
> said first channel comprising first circuit means for producing a stop/start control signal for initiating operation of said stepping motor when said device is beyond the established dead-band;
>
> said second channel comprising second circuit means for developing an up/down control signal identifying the direction of movement of said stepping motor when said device is outside of said dead-band.

14. Apparatus as claimed in claim 13, wherein said first channel comprises an adder circuit combining said deviation signal with said bias signal;

> said second channel comprising a subtractor circuit combining said deviation signal with said bias signal.

15. Apparatus as claimed in claim 14, including diode means coupling the outputs of said two channels together to produce a "Start" signal from said first channel when said second channel produces a control signal corresponding to a predetermined one of said directions of motor movement.

* * * * *